(12) United States Patent
Hammer

(10) Patent No.: US 8,045,473 B2
(45) Date of Patent: Oct. 25, 2011

(54) TAILORED RELIEF FOR CONGESTION ON APPLICATION SERVERS FOR REAL TIME COMMUNICATIONS

(75) Inventor: Michael Philip Hammer, Reston, VA (US)

(73) Assignee: Cisco Technology, Inc., San Jose, CA (US)

( * ) Notice: Subject to any disclaimer, the term of this patent is extended or adjusted under 35 U.S.C. 154(b) by 1090 days.

(21) Appl. No.: 11/287,911

(22) Filed: Nov. 28, 2005

(65) Prior Publication Data

US 2007/0121673 A1    May 31, 2007

(51) Int. Cl.
H04L 12/26    (2006.01)

(52) U.S. Cl. .................................... 370/236; 709/232

(58) Field of Classification Search ............ 370/230, 370/236, 400, 410, 468; 709/228, 229, 226; 718/105
See application file for complete search history.

(56) References Cited

U.S. PATENT DOCUMENTS

| | | | |
|---|---|---|---|
| 4,769,811 A * | 9/1988 | Eckberg et al. ............... | 370/236 |
| 6,430,275 B1 | 8/2002 | Voit et al. | |
| 6,801,944 B2 | 10/2004 | Motoyama et al. | |
| 6,839,340 B1 | 1/2005 | Voit et al. | |
| 6,862,625 B1 | 3/2005 | Busey et al. | |
| 7,046,665 B1 * | 5/2006 | Walrand et al. ............... | 370/392 |
| 7,359,322 B2 * | 4/2008 | Khurana et al. ............... | 370/230 |
| 7,418,523 B2 * | 8/2008 | Pettyjohn et al. ............. | 709/250 |
| 7,457,245 B2 * | 11/2008 | McAlpine et al. ............ | 370/230 |
| 7,778,242 B1 * | 8/2010 | Barany et al. ................. | 370/356 |
| 2002/0083175 A1 * | 6/2002 | Afek et al. .................... | 709/225 |
| 2002/0089989 A1 * | 7/2002 | Christensen et al. ..... | 370/395.42 |
| 2003/0040280 A1 * | 2/2003 | Koskelainen ................ | 455/67.1 |
| 2003/0076781 A1 * | 4/2003 | Enomoto et al. ............. | 370/229 |
| 2003/0123393 A1 * | 7/2003 | Feuerstraeter et al. ....... | 370/235 |
| 2004/0001434 A1 * | 1/2004 | Chen et al. .................... | 370/229 |
| 2004/0240389 A1 * | 12/2004 | Bessis et al. .................. | 370/252 |
| 2005/0025105 A1 * | 2/2005 | Rue .............................. | 370/338 |
| 2005/0159156 A1 * | 7/2005 | Bajko et al. ................ | 455/435.1 |
| 2007/0021212 A1 * | 1/2007 | Liu et al. ....................... | 463/40 |

* cited by examiner

Primary Examiner — Kwang B Yao
Assistant Examiner — Alex Skripnikov
(74) Attorney, Agent, or Firm — Brinks Hofer Gilson & Lione

(57) ABSTRACT

Techniques for managing computational load in real-time communications include receiving usage data on a particular node of a packet-switched network. The usage data indicates an amount of computational resources consumed on that particular node by application layer processes for a first type of data packet. It is determined whether this amount exceeds a threshold amount associated with performance degradation. If it is determined that the amount exceeds the threshold, then a message is sent to a different node on the network. The message includes overload state data that indicates the type of data packets and a reduction request. The reduction request indicates a request to reduce an amount of those type data packets that are sent to the particular node in a particular way. These techniques allow application traffic to be diverted under more specific control than approaches that stop all traffic of all data types to the node.

25 Claims, 7 Drawing Sheets

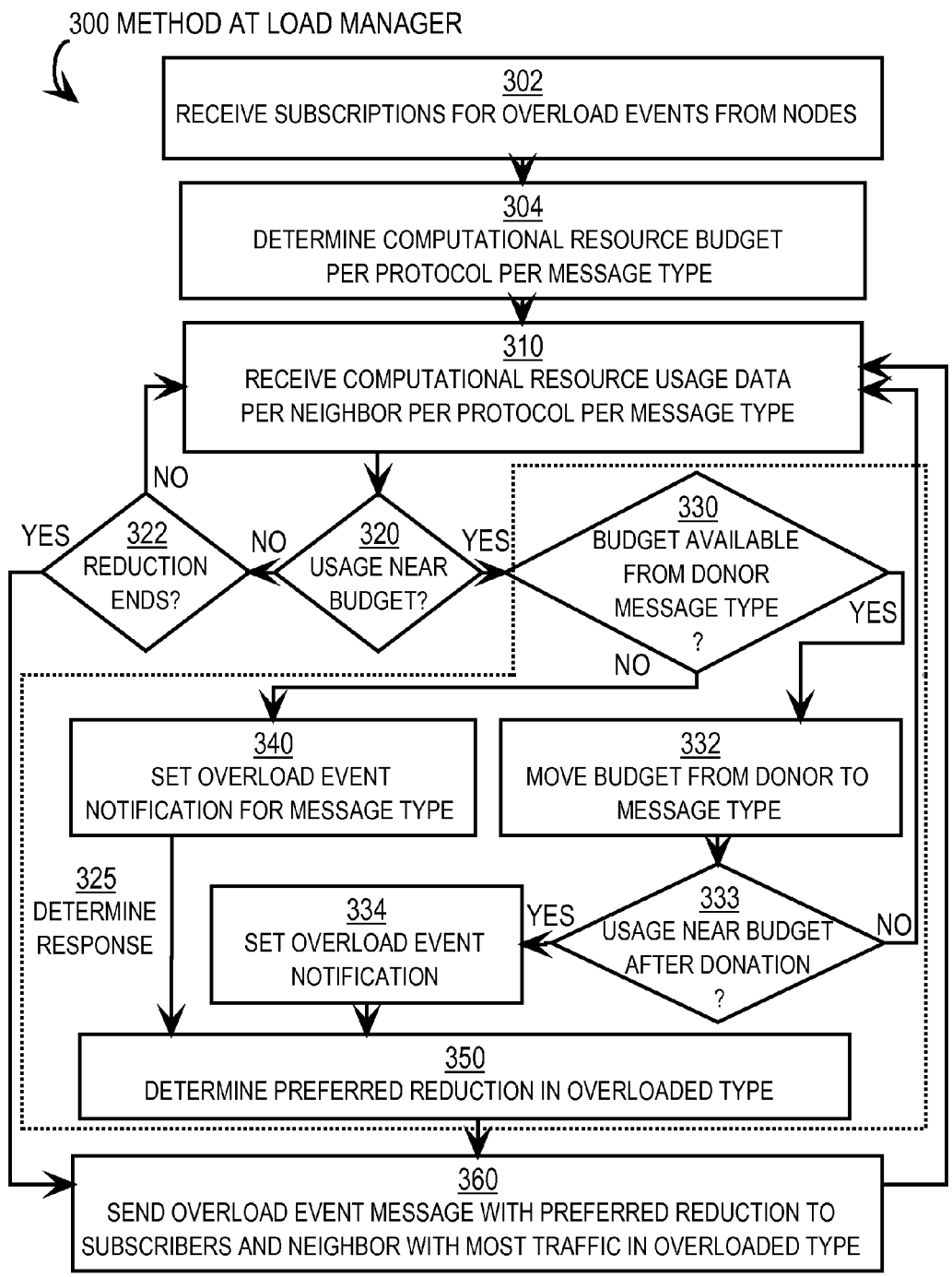

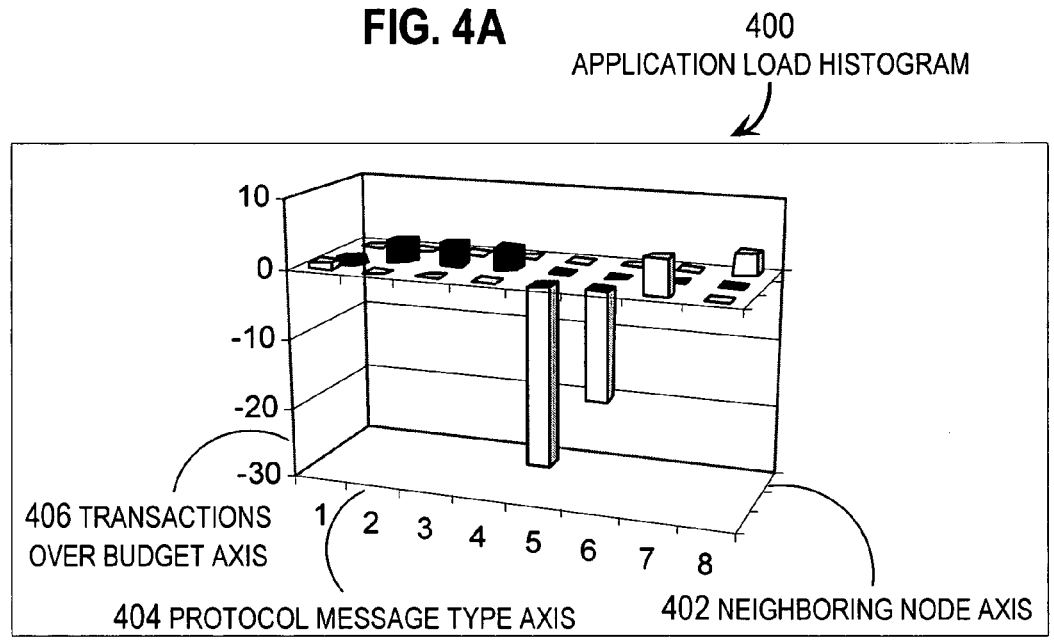
FIG. 4A 400 APPLICATION LOAD HISTOGRAM
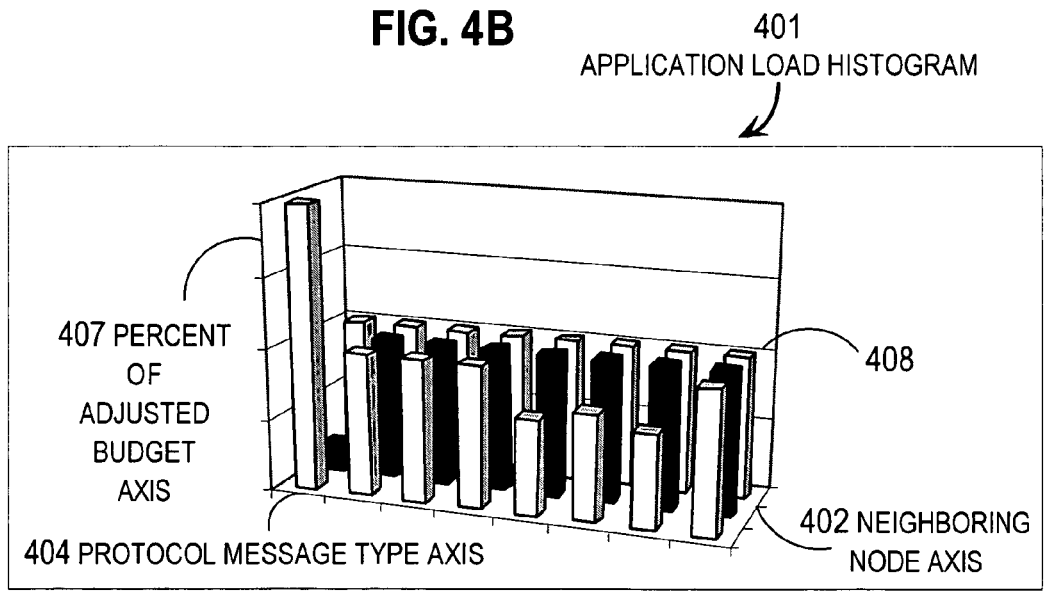
FIG. 4B 401 APPLICATION LOAD HISTOGRAM

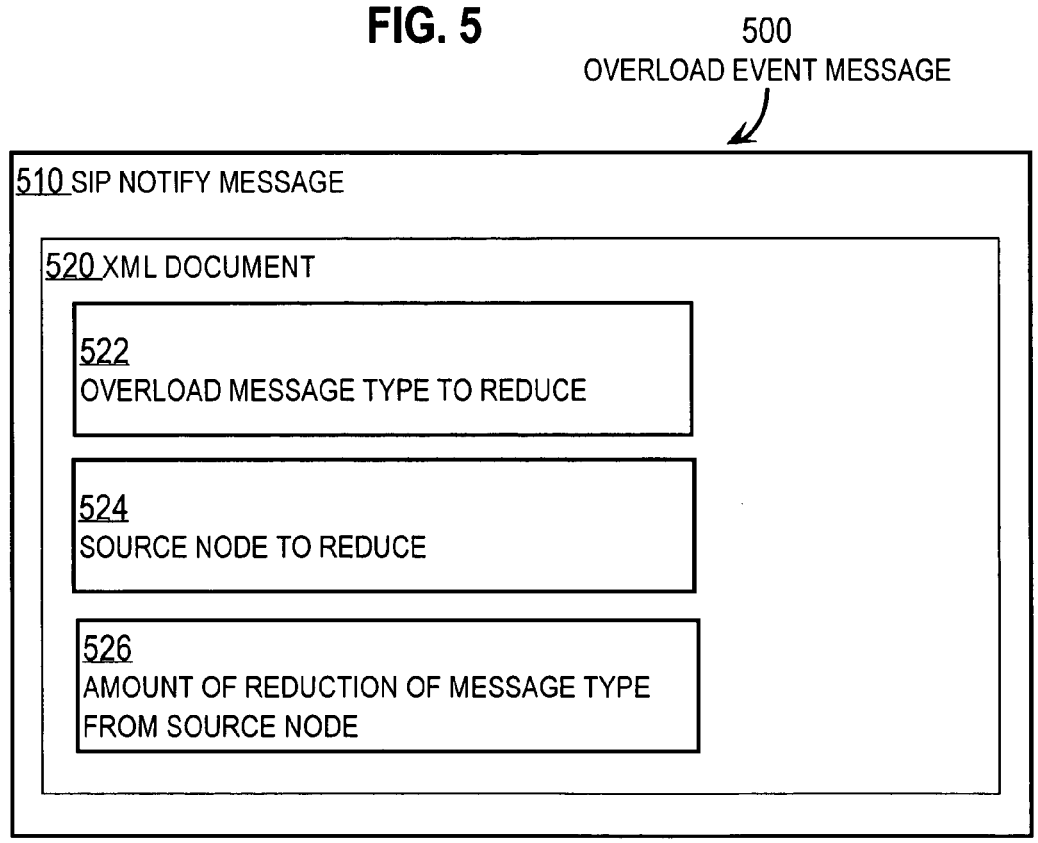

TAILORED RELIEF FOR CONGESTION ON APPLICATION SERVERS FOR REAL TIME COMMUNICATIONS

BACKGROUND OF THE INVENTION

1. Field of the Invention

The present invention relates to relieving processing load at hosts of server processes that provide services for real time communications in a network; and, in particular, to obtaining differentiated relief from different types or sources of requests for services at an overloaded server host, or both.

2. Description of the Related Art

Networks of general-purpose computer systems and other devices connected by external communication links are well known. The networks often include one or more network devices that facilitate the passage of information between the computer systems and devices. A network node is a network device or computer system connected by the communication links. As used herein, an end node is a network node that is configured to originate or terminate communications over the network. In contrast, an intermediate network node facilitates the passage of data between end nodes.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes on a packet-switched network are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, typically higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header, and some combination of a transport (layer 4) header, a session (layer 5) header, a presentation (layer 6) header and an application (layer 7) header as defined by the Open Systems Interconnection (OSI) Reference Model. In networking parlance, a tunnel for data is simply a protocol that encapsulates that data.

The popularity and good performance of packet switched networks has led to the expanded use of such networks for real-time communications to support such applications as telephony, multimedia conferencing, gaming, and other real-time shared data applications. Such applications involve the setting up of sessions (often termed "calls" in reference to traditional telephony) between two or more users of end nodes, and terminating those sessions when the communications end. To initiate (or "set up"), maintain and terminate (or "tear down") those sessions, one or more intermediate network nodes send signaling data to end nodes and other intermediate nodes.

The Session Initiation Protocol (SIP) is the Internet Engineering Task Force's (IETF's) standard layer 5 protocol for multimedia conferencing over the Internet Protocol (IP), a widely used layer 3 protocol. SIP is a character-based, application-layer control protocol that can be used to establish, maintain, and terminate calls between two or more end points. IETF publishes an adopted standard for Internet technologies as a Request for Comments (RFC), available on the public Internet at the IETF domain ietf in the class org in the directory named rfc. SIP is described in RFC 3261 in that directory in a file named rfc3261.txt, the entire contents of which are hereby incorporated by references as if fully set forth herein. SIP is designed to address the functions of signaling and session management within a packet switched telephony network. Signaling allows call information to be carried across network boundaries. Session management provides the ability to control the attributes of an end node-to-end node call.

SIP provides the capability to determine the location of the target end point—SIP supports address resolution, name mapping, and call redirection; and SIP provides the capability to determine the media capabilities of the target end point—via Session Description Protocol (SDP). SIP determines the "lowest level" of common services between the end points. Conferences are established using only the media capabilities that can be supported by all end points. SIP provides the capability to determine the availability of the target end point. SIP also supports mid-call changes, such as the addition of another end point to the conference or the changing of a media characteristic or codec. SIP supports the transfer of calls from one end point to another and terminates the session between the transferee and the transferring party. At the end of a call, SIP terminates the sessions between all parties. SIP supports setting up conference calls of two or more users, which can be established using multicast or multiple unicast sessions.

SIP-based networks provide many call services, such as call session control, proxies for call session control, user location, interactive voice response (IVR), authentication, encryption, compression, translation, call forwarding and gateways to other networks, among others. Call services also include International Telecommunication Union-Telecommunications Standardization Sector (ITU-T) defined Integrated Services Digital Network (ISDN) Supplementary Services, such as Call Forwarding (CF) Busy, CF-No Answer, CF-Unconditional, Automatic Call Back, Automatic Recall, Call Waiting (CW), Call Transfer, 3-way calling, and Conference Calling, among others. Many of the call services that SIP supports are provided by servers. The client-server model of computer process interaction is widely known and used in commerce.

According to the client-server model, a client process sends a message including a request to a server process, and the server process responds by providing a service. The server process usually returns a message with a response to the client process. Often the client process and server process execute on different devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy.

In a peer-to peer (P2P) model, the two processes are equals and symmetric, that is, either side may play the client or server. SIP uses the P2P model for the end nodes, at least. The combined client/server is called a User Agent (UA). Thus a UA may either initiate or respond to calls. The primary intermediate node called a proxy also plays both client and server roles and acts as a peer to a UA on an end node.

As the number of calls handled by a network increases, the signaling to initiate, maintain and terminate those calls increases. Requests for call services to support those calls also increase at the nodes that host severs for those services. Such nodes tend to aggregate signaling traffic. At some level of use, one or more of the server hosts become so fully loaded with processing requests for services, that they can not accept additional requests. At the point of responding to no more requests, the host and server fails to provide the service to at least some calls. Some such failures can lead to failure of the network, and result in many dissatisfied and even angry subscribers. For example, as a server host fully exerts it computational resources of central processing unit (CPU) cycles and memory to handle existing requests, the number of call completions is observed to decline. Clients that don't get responses back in timely manner will retransmit the request. A proxy can find itself increasing its computational resources for rejecting requests, while decreasing its computational resources for getting real work done, such as completing call setups. A typical progression evolves from using all expended computational resources on completing calls, to using a percent less than 100% to completing calls and the remainder to process retransmissions and rejecting new calls, to using all its computational resources on processing retransmissions and rejecting new calls, to crashing and performing no call processing.

The goal is to optimize the servicing of call service requests ("goodput") rather than optimizing throughput that includes processing retransmissions and rejections. Commercial devices complete 100% of calls at the design capacity, and complete 95% of design capacity even when overloaded at 150% of designed capacity. For example, if a node can handle 100 calls per second (CPS) at design capacity, then as the load rises to 150 offered CPS, the node completes 95 CPS, and rejects 55 CPS. Five percent of its capacity is devoted to rejecting those 55 CPS.

In one approach, a host for a heavily loaded server (at some percentage over its designed 100% completion capacity) is programmed to reject all service requests. While this is suitable for some purposes, it often does not cure the problem. For example, rejecting SIP INVITE messages from calls in progress causes a client node making the request to retransmit the request. The server still expends host resources in dealing with the retransmissions. Furthermore, this approach can cause the host to fail ("crash") as the server starts to spend more central processing unit (CPU) cycles and memory on detecting and rejecting the additional service requests.

In another approach, a heavily loaded server host is programmed to reject service requests for new calls, but to accept requests for calls in progress. While suitable for some circumstances, this approach suffers some disadvantages. A significant disadvantage is that the heavily loaded host must expend computational resources to examine and distinguish a new call setup message (e.g., a SIP INVITE message) from a mid-call modification message (e.g., also a SIP INVITE message). Furthermore, this approach can cause the host to fail ("crash") as the server starts to spend more computational resources on detecting and distinguishing among types of call requests.

In one approach, multiple nodes are included in the network to host the same server, and a heavily loaded host refuses more call requests in the expectation that the other host can absorb the extra work until the host reduces its load. For example a SIP 503 response message with a RETRY AFTER header (field) is sent to a neighboring network node that sends the offending request. This message is a signal to stop sending all further SIP messages (no matter the type of SIP message) to the host until a time indicated by data following the "RETRY AFTER" characters in the RETRY AFTER field. While delaying the onset of system failure, this approach does suffer some deficiencies. For example, if two equivalent hosts are each at 90% capacity, the refusal of all requests by one server might result in all traffic for that service being directed to the other server host. The new traffic quickly fully loads the other server host, and the other host also refuses new requests. This can generate a cascade of failing server hosts and a failure of the system to provide the call service and the premature termination or refusal of many calls on the network. Again, dissatisfied and even angry subscribers are generated.

Another disadvantage of this approach is that some services are hosted by nodes of the network that are connected to a large number of other nodes, such as a provider edge node that aggregates calls from a large number of SIP phones. When one SIP phone sends a request that causes that host to become heavily loaded, the SIP 503 RETRY AFTER message is sent to the one phone. The host is still inundated with traffic from the many remaining SIP phones that are unaware of the load burdening the edge node. Thus the message is ineffective because of the large fan-out of devices generating the traffic. Another SIP 503 RETRY AFTER message must be sent to each new SIP phone making a call.

Based on the foregoing, there is a clear need for techniques to respond to heavy computational load conditions at a call server host, which do not take as many computational resources on the heavily loaded host as prior art approaches.

There is also a clear need for techniques that do not stop all traffic to a server host, which can lead to cascading failures, but can determine a portion of the traffic to delay or divert.

There is also a clear need for techniques that easily notify all network nodes in a fan-out, which are sending traffic that heavily loads the receiving server host, without adding more work to the heavily loaded server host.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates at a high level a method for issuing overload events on a load manager on a call server host, according to an embodiment;

FIG. 4A is a graph that illustrates usage over budget for cells in a two dimensional histogram that indicates neighboring nodes and protocol-message type, according to an embodiment;

FIG. 4B is a graph that illustrates percentage usage of adjusted budget for cells in a two dimensional histogram that indicates neighboring nodes and protocol-message type, according to an embodiment FIG. 5 is a block diagram that illustrates data fields in an overload event message, according to an embodiment.

DETAILED DESCRIPTION

A method and apparatus are described for managing computational load for real-time call services in a packet-switched network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of SIP call services using SIP method types to manage computational load. However, the invention is not limited to this context. In other embodiments, call services that support other real-time communications signaling protocols are used, such as Real-time Transport Protocol (RTP) and H.323, well known in network communications. H.323 is a standard for real-time communications promulgated by the ITU-T, Study Group 16 (SG16). Furthermore, in the illustrated embodiments, load management information, called herein an overload event message, is sent among servers using SIP. However, in other embodiments, the load management information is sent over one or more messages involving one or more different protocols, such as the HyperText Transfer Protocol (HTTP) and HTTP carrying Simple Object Access Protocol (SOAP) messages which encode parameters and return values in the extensible Markup Language (XML) for objects defined on a remote host. SIP, HTTP, SOAP and XML are widely known and used in commerce.

1.0 Real-Time Packet-Switched Network Overview

Figure 1:
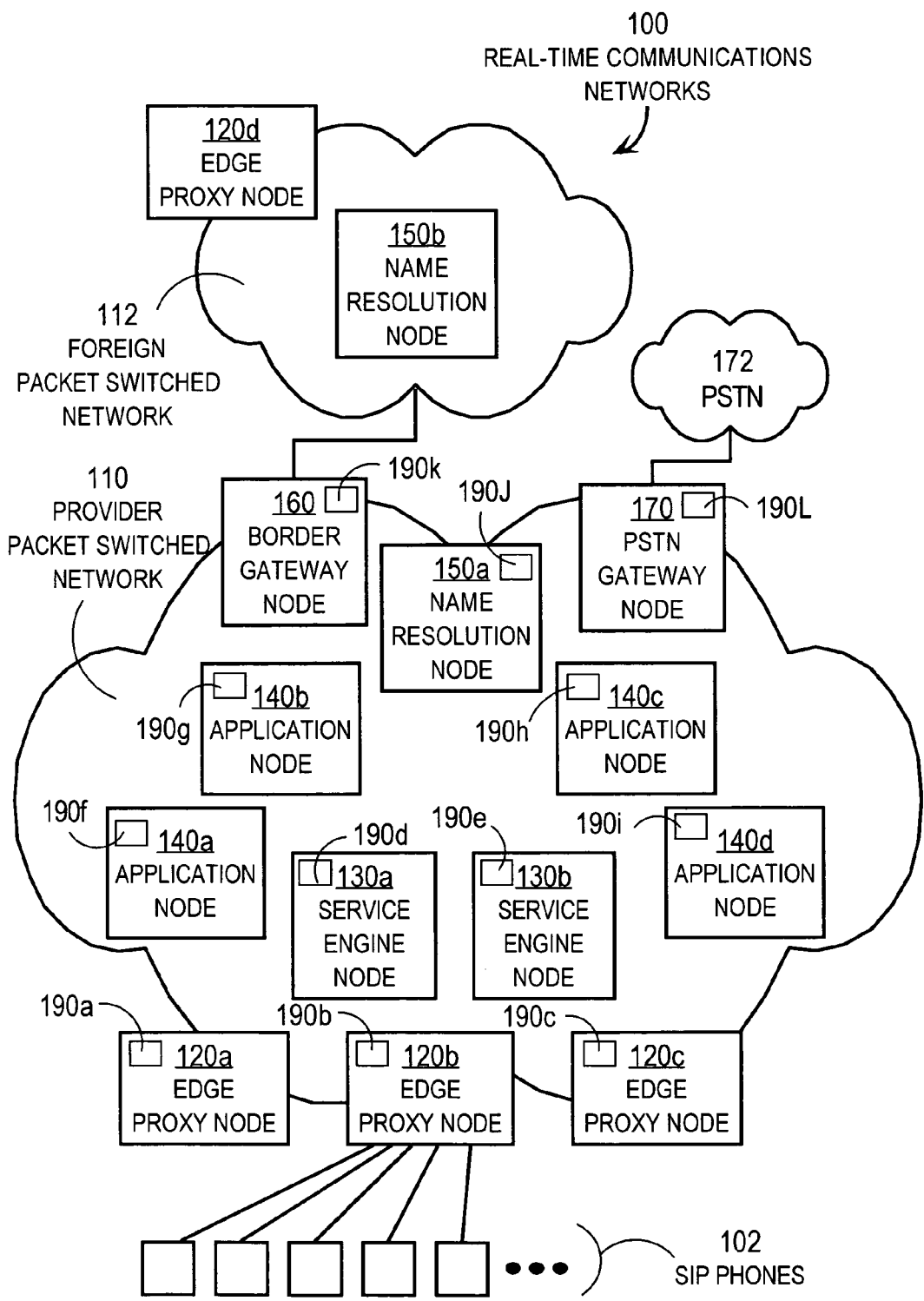
FIG. 1 is a block diagram that illustrates real-time communications networks including a packet-switched network, according to an embodiment.

FIG. 1 is a block diagram that illustrates real-time communications networks 100 including a packet-switched network, according to an embodiment. The public-switched telephone network (PSTN) 172 is a legacy network for real-time communications and is based on analog signals passed through physically switched circuits. Packet switched networks (PSNs) are offered by one or more providers and use the same physical infrastructure to pass traffic from multiple end nodes at overlapping usage times. PSNs are now being used to carry real-time communications to both complement and compete with legacy PSTNs. For purposes of illustration, real-time communications networks 100 includes a PSN 110 of one network service provider and a foreign PSN 112 of a different network service provider and PSTN 172.

The provider PSN 110 includes many nodes involved in real-time communications. Nodes engaged in real-time communications depend on adjacent nodes to send and process call signaling information. The nodes engaged in signaling for call services are often termed "call state control function" (CSCF) nodes. The CSCF nodes are often categorized as proxy CSCF (P-CSCF) nodes, serving CSCF (S-CSCF) nodes and interrogating CSCF (I-CSCF) nodes. The P-CSCF nodes are the first contact point for customer premises nodes, sometimes called user equipment (UE). The S-CSCF nodes actually handle the call states in the provider PSN 110. The I-CSCF nodes hold the primary contact information within the provider PSN 110 for all connections destined to a customer of the provider and mobile nodes of customers of a foreign provider which are currently in the provider's service area.

In the illustrated embodiment, the P-CSCF nodes are edge proxy nodes 120a, 120b, 120c, 120d, collectively referenced hereinafter as edge proxy nodes 120. In the illustrated embodiment, the S-CSCF nodes are call service engine nodes 130a, 130b (collectively referenced hereinafter as service engine nodes 130). In the illustrated embodiment, the I-CSCF nodes are name resolution nodes 150a, 150b (collectively referenced hereinafter as name resolution nodes 150).

The provider PSN 110 includes proxy edge nodes 120a, 120b, 120c, service engine nodes 130a, 130b, and name resolution node 150a. The provider PSN 110 also includes nodes that host call applications, such as interactive voice response (IVR), authentication, encryption, compression, translation, call forwarding (CF)-busy, CF-no answer, CF-unconditional, automatic call back, automatic recall, call waiting (CW), call transfer, 3-way calling, and conference calling, among others. Such applications are hosted on applications nodes 140a, 140b, 140c, 140d, (collectively referenced hereinafter as application nodes 140). The choice of one or more of these applications, and which node of several hosting the same application, is made by a call service engine process executing on one or more of the service engine nodes 130.

Real-time communications are extended to other networks through gateway nodes. As shown in FIG. 1, border gateway node 160 connects real-time communications over provider PSN 110 to foreign PSN 112. Border gateway node 160 includes a signaling gateway server for signaling and a media gateway server for real-time data transfer. Edge proxy node 120d and name resolution server node 150b reside in foreign PSN 112. PSTN gateway node 170 includes a signaling gateway converting PSN signaling protocol, such as SIP, to a PSTN signaling protocol, such as Common Channel Signaling System No. 7 (SS7), and a media gateway for real-time data transfer. SS7 is an ITU-T global standard for telecommunications, which defines the procedures and protocol by which network elements in the PSTN exchange information over a digital signaling network to effect wireless (cellular) and wire-line call setup, routing and control.

In the illustrated embodiment, real-time communication end nodes are called SIP phones 102, which are used for SIP telephony. SIP phones include special handsets that look like legacy telephone systems but use SIP over PSN to set up sessions to transport voice data over a suitable protocol, such as the Real-time Transport Protocol (RTP). SIP phones also include personal or other computers outfitted with a microphone and speakers or headphones. Besides SIP phones, other devices that use SIP or other protocols to signal realtime communications of images and other data are included in some embodiments, but are not shown in FIG. 1.

As depicted in FIG. 1, multiple SIP phones are connected to each provider edge proxy node. A large number of end nodes connected to the same edge node constitute a fan out of end node connections at the edge node. For example, a large number of SIP phones 102 fan-out from edge proxy node 120b.

As is well known in the art, in a typical call setup, a P-CSCF node (e.g., proxy edge node 120b) receives a signaling request from UE (e.g., one of the SIP phones 102) to set up a call, and selects an S-CSCF node (e.g. service engine node 130a) to process the signaling request (e.g., a SIP INVITE). The request is forwarded to the selected node, e.g., service engine node 130a. In some embodiments, the P-CSCF node determines whether the user of the UE is authorized to set up calls, such as by exchanging signaling traffic with an Authentication, Authorization and Accounting (AAA) server; in some embodiments, the S-CSCF node determines whether the user is so authorized, such as by exchanging signaling traffic with the AAA server on one of application nodes 140. The location of the called party is determined at the S-CSCF node by exchanging signaling traffic with the I-CSCF node, e.g., with name resolution node 150a or through border gateway node 160 with name resolution server node 150b. The selected S-CSCF node, e.g., service engine node 130a, obtains one or more call services by exchanging signaling traffic with one or more of application nodes 140, e.g., a service engine server on service engine node 130a obtains call-waiting services by exchanging signaling traffic with a call-waiting server on application node 140a.

As described in the background, call service applications can become overloaded as the number of calls handled by a PSN increases. For example, in the illustrated embodiment, as the number of calls entered by SIP phones 102 and other SIP phones increase, one of the service engine nodes 130 or application nodes 140 may be processing so many calls that it cannot accept new call requests. The heavily loaded node can issue a signaling message to pause further requests for service, such as a SIP message with a non-zero value for a RETRY AFTER header parameter. However, the result may cause other problems for the network. For example, if service engine node 130a issues a SIP message with a RETRY AFTER header to edge proxy node 120b, the edge proxy node 120b may send all call requests for all SIP phones 102 to an already heavily used service engine 130b. This may cause service engine node 130b to become fully loaded and also issue a RETRY AFTER header in a SIP message to edge proxy node 120b. Now edge proxy node 120b has no service engine node available and can not change the state of any calls from SIP phones 102 for some duration of time. Service to SIP phones is interrupted for that duration, and customers are inconvenienced or worse.

According to the illustrated embodiments, multiple nodes engaged in call signaling include call application load managers. In FIG. 1, call application load mangers 190a, 190b, 190c, 190d, 190e, 190f, 190g, 190h, 190i, 190J, 190k, 190L (collectively referenced hereinafter as load managers 190), execute on nodes 120a, 120b, 120c, 130a, 130b, 140a, 140b, 140c, 140d, 150a, 160, 170, respectively. In some embodiments, the call application load managers 190 are part of one or more servers on the node, such as within one or more call application servers. In some embodiments, the call application load managers 190 are separate processes running in the background on each of two or mode nodes that exchange call signaling data.

As described in more detail in a later section, the call application load managers 190 detect load conditions that warrant signal traffic adjustments without dropping call service requests or terminating them completely for some duration by a RETRY AFTER header value. The desired traffic adjustments are communicated to other load managers on one or more other nodes to cause traffic from those nodes to be adjusted.

Although a particular number of PSTN 172, foreign PSN 112, gateway nodes 160, 170, application nodes 140, service engine nodes 130, edge proxy nodes 120, end nodes 102 and load mangers 190 are depicted in FIG. 1 for purposes of illustration, in other embodiments more or fewer such components are included.

2.0 Call Server Load Manager

Figure 2:
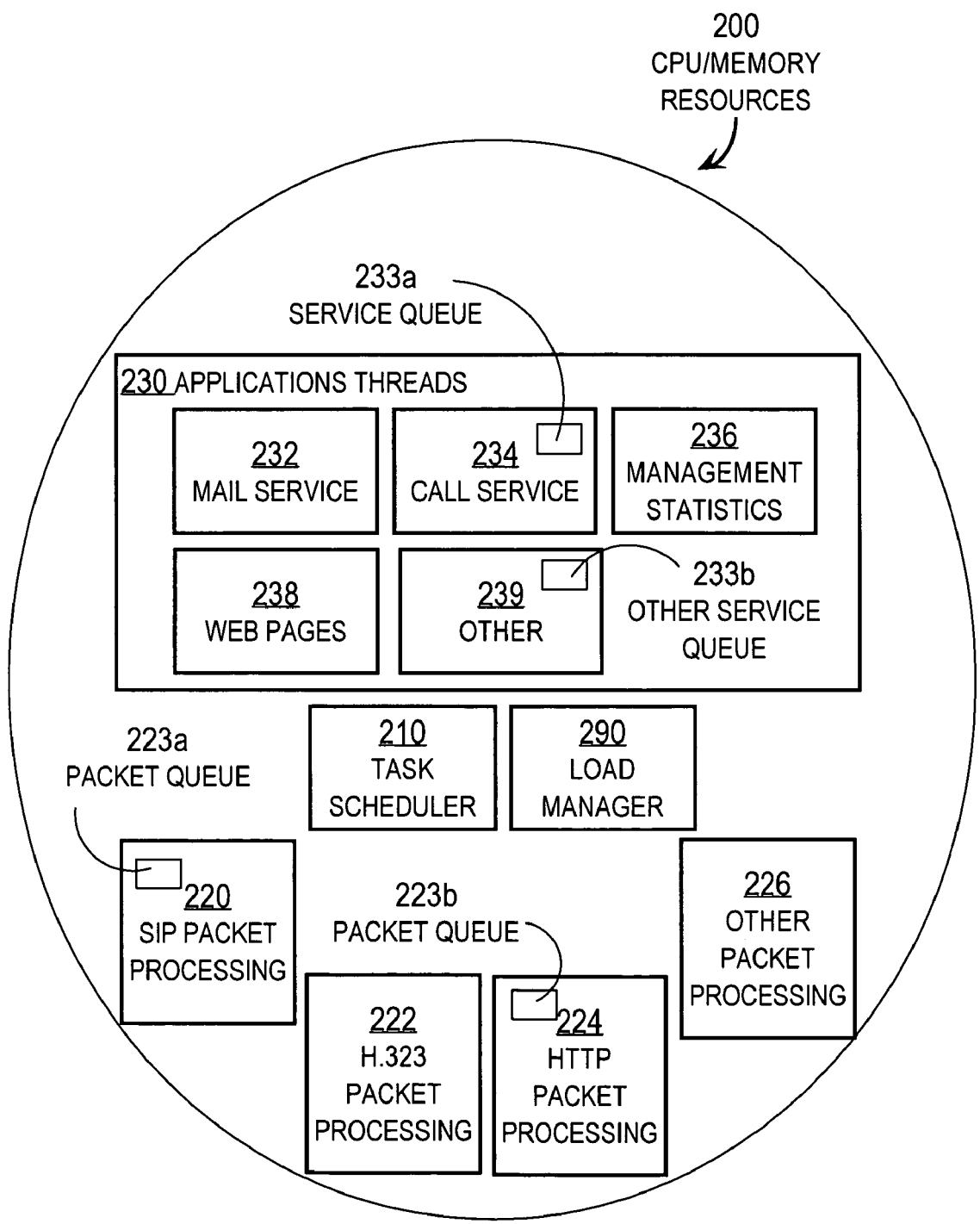
FIG. 2 is a block diagram that illustrates usage of central processing unit and memory resources on a host of a call server, according to an embodiment.

FIG. 2 is a block diagram that illustrates usage of central processing unit and memory resources on a host of a call server, according to an embodiment. The oval 200 represents total central processing unit (CPU) cycles and memory space available at a node for processing transport layer and higher layer payloads in data packets received at the node. The term "computational resources," as used herein, includes either or both CPU and memory resources. In the illustrated embodiment, computational resources for link layer and lower layer protocols are not considered.

Payloads of data packets are directed to corresponding processes on the node. In the illustrated embodiment, a process 220 for SIP headers and payloads, a process 222 for H.323 headers and payloads, a process 224 for HyperText Transfer Protocol (HTTP) headers and payloads, and a process 226 for other layer 4 or above protocol headers and payloads are included. Example other layer 7 protocols include the well known File Transfer Protocol (FTP) and Post Office Protocol (POP) or Simple Mail Transfer Protocol (SMTP) for electronic mail. In other embodiments, more or fewer packet processes are included. Some or all include a packet queue for storing headers and payloads of packets received or sent in the corresponding protocol. In the illustrated embodiment, SIP packet process 220 includes packet queue 223a and HTTP packet process 224 includes packet queue 223b.

A task scheduler 210 is an operating system process that allocates computational resources to other processes. The task scheduler 210 allocates computational resources to packet processes 220, 222, 224, 226 among others. Some payloads in the packets processed are directed to applications available for execution on the node. The task scheduler 210 allocates computational resources to each instance of an application invoked to process the payload of one of the data packets received.

The task scheduler 210 allocates computational resources to one or more application threads 230, where a thread is a portion of an application that is in a state to be swapped into CPU when clock cycles on the CU become available. In the illustrated embodiment, the applications threads include a mail service thread 232, a call service thread 234, a management statistics thread 236, a web pages thread 238, and another thread 239 for performing another call service. Any or all of theses threads have a queue to hold data for the application, such as a request for a web page or a request for a call service. In the illustrated embodiment, the call service thread 234 includes a service queue 233a to hold requests for the service provided by that application, e.g., a call waiting service. The other service thread 239 includes another service queue 233b to hold requests for the service provided by that application thread, e.g., a call forwarding service. Herein the queues 233*a*, 233*b* are collectively termed call service queues 233.

According to illustrated embodiments of the invention, a load manager process 290 executes on the node outside the applications threads to determine how much of the node's computational resources are still available for the call service applications. The load manager 290 is an embodiment of the load managers 190 depicted in FIG. 1. In other embodiments, a load manager 190 is included within one or more of the call service threads, e.g., threads 234 and 239.

In some embodiments, the load manager 290 receives data from the task scheduler 210 about the available computational resources for one or more call application threads. In some embodiments, the load manager 290 uses more direct measurements to deduce the available computational resources for one or more call application threads. For example, in various embodiments, the load manager 290 determines the size of each call service queue 233 or the degree to which each call service queue 233 is full, or both. In some embodiments, the percentage of each call service application queue 233 that is full is a measure of the degree to which the corresponding application is fully loaded and on the verge of overload. In some embodiments, data in or associated with each queue 223, 233 indicates the number of transactions (e.g., calls) stored in the queue; and the load manager 290 determines that number from the associated data.

3.0 Method at Load Manager

FIG. 3A is a flow diagram that illustrates at a high level a method 300 for issuing overload events on a load manager on a call server host, according to an embodiment. Although steps are shown in FIG. 3A and following flow diagrams in a particular order for purposes of illustration, in other embodiments one or more steps may be performed in a different order or overlapping in time or may be omitted or changed in some combination of ways.

In step 302, data is received from anther node that indicates a subscription for notification in case of an overload event. Node subscriptions for notification are well known in the art. In some embodiments, a SIP SUBSCRIBE message is received during step 302. According to some embodiments, a SIP SUBSCRIBE message is extended to indicate one or more new types of events for which the subscribing node is to be notified. For purposes of illustration it is assumed that the new events are passage of one or more thresholds of load levels for protocols or message types that support call service applications. For example, a SIP SUBSCRIBE message is received with data that indicates the event of interest is when an application reaches the vicinity of the maximum computational resources the node was designed to provide that application, such as when the call application queue 233 is near full or the number of calls approaches a design maximum. In some embodiments, a SIP SUBSCRIBE message is received from a particular node that sends its call forwarding requests to the node where the load manager executes. The SIP SUBSCRIBE message indicates the particular node and the service protocol or message type, e.g., the SIP INVITE method type. In the illustrated embodiment, to limit the load on the host, subscription are received or accepted only from neighboring nodes. Neighboring nodes are network nodes that communicate directly over a data network connection. In some embodiments that use other methods to inform other nodes of overload events, step 302 is omitted.

In step 304, a computational resource budget is determined for each protocol and for each message type of interest within the protocol. A message type within SIP is called a method type; and includes INVITE, ACK, UPDATE, CANCEL, BYE, among others.

In some embodiments, the SIP and non-SIP message types are grouped to associate message types with applications or groups of applications. For purposes of illustration, it is assumed that the applications are grouped according to the protocols and message types listed in Table 1. The protocols used in the example include SIP, HTTP, the Simple Mail Transfer Protocol (SMTP) and the Simple Network Management Protocol (SNMP).

TABLE 1

Message groups use to manage load on a call service node

| # | Protocol | Message group | Message types in group |
|---|----------|---------------|------------------------|
| 1 | HTTP | Get | GET |
| 2 | " | Put | PUT |
| 3 | SMTP | Send | SEND |
| 4 | " | Receive | RECEIVE |
| 5 | SIP | Mid-Call | ACK, responses, PRACK, INFO, UPDATE, CANCEL, BYE |
| 6 | " | Invite | INVITE |
| 7 | " | Non-call | OPTIONS, SUBSCRIBE, NOTIFY, PUBLISH, REGISTER, REFER, MESSAGE |
| 8 | SNMP | Get | GET, GET-NEXT, GET-RESPONSE, SET-REQUEST, TRAP |

Any method may be used to determine the budget. In an illustrated embodiment, the budget is based on a target that outlines the functions for the node. The target is the designed distribution of resources when the node is fully loaded. At full load no data packets are dropped; above full load data packets begin to be dropped. For example at 150% load all data packets but 95% of the design capacity are dropped, and problems arise associated with extra processing to handle retransmissions.

In some embodiments, the target is simply the initial size of the call service queue 233; in some embodiments, the target is a statically configured maximum size for the call service queue. In some embodiments, the target is the amount of the computational resources that may be consumed by the application when the node is fully utilized. For example, if a node provides a web page, an email service, a call forwarding service, and a call waiting service, then, in some embodiments, the targets indicate a percentage of the total resources on the node allowed for sending the web page (e.g., 12%), processing email (e.g., 8%), responding to call forwarding (e.g., 40%) and responding to call waiting (e.g., 40%) when the node is fully utilized. For purposes of illustration, it is assumed that the targets for a particular node are the designed number of transactions per second associated with full utilization at the node for each of three node neighbors, as given in Table 2. In Table 2 it is assumed that 100 transactions per second is 100% utilization. The protocols and message types listed in Table 2 account for 91 transactions per second (e.g., 91% of the capacity of the node).

TABLE 2

Example target usage of resources at a particular call service application node.

| Protocol | Message group | N1 | N2 | N3 |
|----------|---------------|----|----|----|
| HTTP | Get | 1 | 2 | 0 |
| " | Put | 0 | 2 | 0 |
| SMTP | Send | 0 | 2 | 0 |
| " | Receive | 0 | 2 | 0 |

TABLE 2-continued

Example target usage of resources at a particular call service application node.

| Protocol | Message group | N1 | N2 | N3 |
|---|---|---|---|---|
| SIP | Mid-Call | 45 | 0 | 0 |
| " | Invite | 30 | 0 | 0 |
| " | Non-call | 5 | 0 | 0 |
| SNMP | Get | 0 | 0 | 2 |

It can be inferred from Table 2 that the target resources for email and HTTP resources are associated with one neighbor (N2), and that the SIP resources are associated with another neighbor (N1), and that node management traffic is associated with the third neighbor (N3). It is not implied that there are separate queues for each message type (e.g., SIP "method" type) for the same application or for separate neighbors, although separate queues are employed in some embodiments. It is only suggested that the total queue size for an application is expected to be shared among the message types and neighbors using the application.

The target resources represent the expected usage when the node is fully loaded as designed. To allow better use of the node when the node is not fully loaded as designed, it is anticipated that a temporary budget of resource utilization can be defined that differs from these targets. For example, if at a particular time there is more email traffic than the designed maximum, but less call servicing traffic, then the budget for email may be temporarily increased and the budget for call servicing temporarily decreased from the target values. This process is described in more detail below. Initially, the budget for each message type of each application layer protocol is set equal to the target value.

In step 310, computational resource usage is received with any desired degree of granularity. In the illustrated embodiment, usage is separated for each neighboring node, application layer protocol, and message type within the protocol. Any method may be used to receive this data. In some embodiments, the usage data is retrieved from within the node, such as from a message from the task scheduler, from reading data stored in a data structure in volatile or non-volatile memory, or from measurements of traffic on a data bus or communications channel. In the illustrated embodiment, the usage data is received by scanning some or all the data in the call service queues 233 on the node. In embodiments in which usage data is not differentiated by application but only by protocol and neighboring node, usage data is received by scanning some or all the data in the packet queues 223 on the node.

It is assumed for purposes of illustration that the call service queues 233 include fields that indicate the protocol, the message type, and the source or destination node different from the node hosting the load manager for each transaction and the total number of transactions in the queue. In some embodiments, the call service queues 233 include fields that indicate for each transaction the amount of memory used to store the transaction and the total memory size of the queue. Based on this data in the call service queues, the load manager can determine the usage at the level of granularity of any embodiment.

For purposes of illustration it is assumed that usage data is received as indicated in Table 3 from protocol packet queues 223. Table 3 is based on summing the transactions in the packet queues of several protocols on the same node and shows 68 transactions (e.g., 68% of the capacity of the node).

TABLE 3

Example usage data for applications at a call application node.

| Protocol | Message group | N1 | N2 | N3 |
|---|---|---|---|---|
| HTTP | Get | 2 | 1 | 0 |
| " | Put | 0 | 5 | 0 |
| SMTP | Send | 0 | 5 | 0 |
| " | Receive | 0 | 5 | 0 |
| SIP | Mid-Call | 20 | 0 | 0 |
| " | Invite | 15 | 0 | 0 |
| " | Non-call | 10 | 0 | 0 |
| SNMP | Get | 0 | 0 | 5 |

For purposes of illustration, it is assumed that the load manager constructs a two dimensional histogram of usage data for use in making determinations described below. One dimension of the two dimensional histogram indicates different neighboring nodes (e.g., the last three columns of Tables 2 and 3). The second dimension of the two dimensional histogram indicates a protocol and message type (e.g., the last eight rows of Tables 1, 2 and 3). Each cell in the histogram indicates the usage of computational resources by a particular combination of neighboring node and protocol-message type.

In step 320, it is determined whether usage is near budget for an application group indicated by a protocol-message type. According to some embodiments of the invention, when usage is near budget for an application group, an application overload event occurs at the node. Any method may be used to determine whether usage is near budget. In an illustrated embodiment, usage is determined to be near budget if usage for an application is within a particular percentage of the total budget for that application. For purposes of illustration it is assumed that usage is near budget when usage is over 50% of budget. In practice, experimentation with different thresholds is used to determine an appropriate value. If usage is not near budget, then control passes ultimately back to step 310 to receive updated usage data. In some embodiments, to avoid wild fluctuations in assessments of proximity to budget, the usage data is averaged over multiple cycles of a processor before being compared to the budget.

In the illustrated embodiment, if usage is not near budget, then control passes first to step 322. In step 322 it is determined whether a reduction request previously sent should end. Reduction requests are described in more detail below with reference to step 350. Any method may be used to determine whether a reduction request should end. For example, if usage falls below 50% of budget for all message types, then one or more reduction requests can be rescinded. If it is determined in step 322 that no reduction requests are to end, control passes back to step 310 to receive updated usage data. However, if it is determined in step 322 that a reduction request should end, control passes to step 360 to send a SIP NOTIFY message with the preferred reduction removed or other equivalent to a reduction of 0%, as described in more detail below. In some embodiments, step 322 is omitted and reduction requests expire automatically after a particular time.

In an illustrated embodiment, usage as listed for example in Table 3 is compared to a budget as listed in Table 2. In other embodiments, usage is compared to budget using other measures, such as the usage of queue space in the application queues 233. Table 4a shows the difference between the target (original budget) values in Table 2 and usage in Table 3. The differences are also plotted in FIG. 4A. In Table 4, a negative value means that actual usage is within budget; a positive value indicates an excessive usage that begs for attention. In the illustrated embodiment, the occurrence of non-negative values at the appropriate level of granularity causes control to pass to step 330. The total of all cells in Table 4 is −23 indicating that overall, the node is under budget and therefore has processing resources available to make adjustments in the budget.

TABLE 4a

Example differences between target and actual resource usage on node.

| Protocol | Message group | N1 | N2 | N3 |
|---|---|---|---|---|
| HTTP | Get | 1 | −1 | 0 |
| " | Put | 0 | 3 | 0 |
| SMTP | Send | 0 | 3 | 0 |
| " | Receive | 0 | 3 | 0 |
| SIP | Mid-Call | −25 | 0 | 0 |
| " | Invite | −10 | 0 | 0 |
| " | Non-call | 10 | 0 | 0 |
| SNMP | Get | 0 | 0 | 3 |

In the illustrated embodiment, usage is determined to be near budget with finer granularity than the entire application group. Such embodiments are especially effective when separate packet queues are maintained for separate message types or separate neighbors. In some embodiments it is determined that usage is near budget if usage for a message type within a protocol is within a particular percentage (e.g., 50%) of the total budget for that message type across all neighbors.

FIG. 4A is a graph that illustrates usage over budget for cells in a two dimensional histogram 400 that indicates neighboring nodes and protocol-message type, according to an embodiment. This histogram represents usage comparisons with finer granularity than just the call service application. The horizontal neighboring node axis 402 indicates different neighboring nodes (N1, N2, N3) to the node at which the load manager process 290 is executing. The horizontal protocol-message type axis 404 indicates different protocols and message types used by applications executing on the node with the load manager 290; where the numbers 1 through 8 represent the protocol-message types in the last eight rows of Table 1, respectively. A cell that represents a particular combination of protocol, message type and neighbor, e.g., an entry in Table 4a, occupies a rectangular region in the two dimensional area formed by axes 402, 404. The vertical transactions axis 406 indicates how much the traffic is above (positive) or below (negative) the budget in transactions per second. Usage for any less fine level of granularity can be computed by combining usage from all cells of histogram 400 that fall within the larger grains. In FIG. 4A, it is clear that there are many cells at or over budget.

Table 4b shows the proximity to budget as a percentage of the budget value. As described in more detail below, the percentage to which a cell is near or above budget is used to determine how large a reduction in traffic to request of a particular type. A cell with a budget of zero and no usage is considered at 100% of budget in Table 4b. For purposes of illustration, it is assumed that usage is near budget if usage is over a threshold of 50% of budget. In other embodiments, one or more other percentages are used as thresholds.

TABLE 4b

Example percentage of budget for actual resource usage on node.

| Protocol | Message group | N1 | N2 | N3 |
|---|---|---|---|---|
| HTTP | Get | 200% | 50% | 100% |
| " | Put | 100% | 250% | 100% |
| SMTP | Send | 100% | 250% | 100% |
| " | Receive | 100% | 250% | 100% |
| SIP | Mid-Call | 45% | 100% | 100% |
| " | Invite | 50% | 100% | 100% |
| " | Non-call | 200% | 100% | 100% |
| SNMP | Get | 100% | 100% | 250% |

If it is determined in step 320 that usage is near budget for an application group and therefore that an application group overload event has occurred, control passes to step 325 to determine a desired response to such usage. In general, the response to be determined is a source or a message type for which a reduction in traffic is desired. In some embodiments, the response includes a particular amount for the reduction in traffic, as described in more detail below. After the response is determined in step 325, control passes to step 360 to send to information about the desired traffic reduction to an appropriate node in the network, as described in more detail below.

In some prior art approaches, a determination that a particular protocol is overloaded results in a message to the neighbor using the protocol to cease all traffic for that protocol for at least some duration of time. Often, the request is sent to all neighbors, regardless of their small contribution to the total traffic. However, in the illustrated embodiments, the message is sent to a neighbor that may be different from the neighbor that sent the request to reduce traffic that may be directed to a different process on the node than the application determined to be near an overloaded state, by an amount that may be different than all traffic directed to that application. Thus in the illustrated embodiments, the source or protocol message type or amount of traffic to be reduced, or some combination, is different from the prior art approaches.

In an illustrated embodiment, during step 325, an application, message type or amount of reduced traffic, or some combination, is determined that is different from the prior art approaches. In the illustrated embodiment, step 325 includes steps 330, 332, 333, 334, 340, and 350. In some embodiments, step 325 is performed only if there are sufficient computational resources at the node to compute a more particularized response than the prior art approach. For example, step 325 is performed only if the total load computed by summing all the values in Table 4 is negative. In the illustrated embodiment, the sum of Table 4 is −23, indicating that the node is not yet at 100% of its computational capacity.

In step 330, it is determined whether there are unused computational resources in the budget for another application group (e.g., protocol or message type) or neighbor, called herein a donor message type, sufficient to alleviate the near overload state of the application group. The determination may be made at any level of granularity maintained by the usage data. For example, the donor may be from another protocol, or from another message type for the same protocol, or from another neighbor of the same protocol and message type.

For example, at the full granularity of FIG. 4A, it is clear that there are a sufficient number of under budget cells protocol-message types 5 and 6 (SIP Mid-Call and Invite, respectively) for neighbor node N1 to provide for much of the over-budget cells. This under-budget capacity can be added temporarily to the budget for one or more message types.

In some embodiments, it is determined during step 330 that budget is available if the donor has been temporarily increased above target values during a previous execution of step 332, described below. As a message type that was decremented below target needs more resources, those resources are preferably taken from message types that were incremented above target values.

In some embodiments, it is determined during step 330 that budget is available only if the donor represents an equal or lower priority message type than the message type near overload. For example, if email traffic is considered lower priority than call forwarding, then the budget is available from email for call forwarding. However, if the donor being considered is higher priority, e.g., if high revenue gaming application SIP message type is higher priority than flat fee call forwarding message type, then the unused budget of the gaming message type is not considered available for the near overloaded call forwarding message type. Other examples of messages of different priority in some embodiments include terminating calls over originating call, and wireless calls over wire-line calls.

If it is determined in step 330 that sufficient resources are not available from a donor protocol/message type to prevent the near overload state of the protocol or protocol-message type, control passes to step 340. In step 340 an overload event is set for the protocol/message type/neighbor. The overload message type may be set at any level of granularity. For example, the overload event can be associated with the protocol in general or with one or more message types used by that protocol or with one or more neighboring nodes for a message type.

If it is assumed that no donor types are available in the illustrated embodiment, then the cells with positive values in FIG. 4A are in an overload state. For example, the SIP Non-Call message type from Node N1 is 5 transactions per second over budget and is an overload state. An overload event is determined in step 340 for SIP Non-Call message types from N1. Similarly, overload events are determined for HTTP Get from N1, HTTP Put from N2; for email (SNMP Send and Receive) from N2; and for management traffic (e.g., node usage statistics) from N3. After the overload events are set in step 340, control passes to step 350 described below.

If it is determined in step 330 that sufficient resources are available from the donor message type to prevent or reduce an overload state of the protocol or message type, control passes to step 332 to move the budget from the donor to the overloaded protocol-message type. For example, transactions are moved from the budgets for SIP calls well under budget in FIG. 4A to at least some SIP Non-Call message type and protocols that are over budget in FIG. 4A. It is assumed for purposes of illustration that the budgets are changed as depicted in Table 5. In Table 5, a negative amount is a number of transactions per second taken from a donor type and a positive amount is a number of transactions per second added to a borrowing type that is near, at or above budget. In Table 5, the total number of transactions is zero; that is, a transaction is added to the budget of one type for every transactions subtracted from the budget of another type It is further assumed that HTTP traffic on N1 is of such low priority that it is not a recipient of resources from donor types.

TABLE 5

Example resource budget donations from donor to borrowing types on a node.

| Protocol | Message group | N1 | N2 | N3 |
|----------|---------------|-----|-----|-----|
| HTTP     | Get           | 0   | 3   | 0   |
| "        | Put           | 0   | 3   | 0   |
| SMTP     | Send          | 0   | 3   | 0   |
| "        | Receive       | 0   | 3   | 0   |
| SIP      | Mid-Call      | −15 | 0   | 0   |
| "        | Invite        | −10 | 0   | 0   |
| "        | Non-call      | 10  | 0   | 0   |
| SNMP     | Get           | 0   | 0   | 0   |

As a result of the donations listed in Table 5, the new temporary budgets are as depicted in Table 6. Table 6 represents the sum of Table 2 and Table 5.

TABLE 6

Example adjusted budget on a node.

| Protocol | Message group | N1 | N2 | N3 |
|----------|---------------|-----|-----|-----|
| HTTP     | Get           | 1   | 5   | 0   |
| "        | Put           | 0   | 5   | 0   |
| SMTP     | Send          | 0   | 5   | 0   |
| "        | Receive       | 0   | 5   | 0   |
| SIP      | Mid-Call      | 30  | 0   | 0   |
| "        | Invite        | 20  | 0   | 0   |
| "        | Non-call      | 15  | 0   | 0   |
| SNMP     | Get           | 0   | 0   | 5   |

In some embodiments, the shift is made from donor only if the shift does not cause the donor to be overloaded or near overloaded. In some embodiments the donor is allowed to become overloaded if the donor application/message type is less valuable to the network service provider than the originally overloaded application/message type. For example, if email service generates less revenue than gaming or IP telephony, than the email application may be allowed to be overloaded or near overloaded if the shift helps prevent overloading of the more valuable applications. In general, email is of lower priority than real-time communications and resources can be shifted to call servicing protocols even if the result is an overloaded or near overloaded state for the email application.

In step 333, it is determined whether the donor usage is now near its budget as a result of the shift of resources. Table 7 shows the proximity to budget as a percentage of the budget. Table 7 is similar to Table 4a, but compared to the adjusted budget instead of the original target usage.

TABLE 7

Example usage percentage of adjusted budget on a node.

| Protocol | Message group | N1   | N2   | N3   |
|----------|---------------|------|------|------|
| HTTP     | Get           | 200% | 20%  | 100% |
| "        | Put           | 100% | 100% | 100% |
| SMTP     | Send          | 100% | 100% | 100% |
| "        | Receive       | 100% | 100% | 100% |
| SIP      | Mid-Call      | 67%  | 100% | 100% |
| "        | Invite        | 75%  | 100% | 100% |
| "        | Non-call      | 67%  | 100% | 100% |
| SNMP     | Get           | 100% | 100% | 100% |

The percentages listed in Table 7 are graphed in FIG. 4B. FIG. 4B is a graph that illustrates usage of budget for cells in a two dimensional histogram 401 that indicates neighboring nodes and protocol-message type, according to an embodiment. The horizontal axes 402 and 404 are as described for FIG. 4A. The vertical transactions axis 407 indicates the percentage of actual traffic compared to the adjusted budget. Each vertical tick mark represents 50%; so tick mark 408 indicates 100% of budget. In FIG. 4B, it is clear that there are many cells at or over 100% of budget. For a 50% threshold, all cells are over budget. For a 70% threshold, all cells are near budget except for Mid-Call and Non-Call SIP messages from neighbor node N1.

If it is determined in step 333 that no protocol/message type/neighbor is near budget, control passes to step 310 to receive updated usage data. If it is determined in step 333 that the any protocol/message type/neighbor is near budget, control passes to step 334 to set an overload event for the near budget protocol/message type/neighbor. For example, an SIP INVITE overload event is set in step 334. Again, the comparison in step 333 is performed at any degree of granularity supported by the histogram in various embodiments.

After either step 340 or step 334, control passes to step 350. In step 350, a preferred reduction amount in the overloaded type is determined. Any method to determine the preferred reduction may be used. For example, in some embodiments, for a state between 70% and 80% of budget, the preferred reduction amount is 10%. For a state between 80% and 90% in this embodiment, the preferred reduction amount is 25%; and for a state between 90% and 100% in this embodiment, the preferred reduction amount is 50%. For a state over 100% in this embodiment, the preferred reduction amount is 90%. For purposes of illustration, it is assumed that the preferred reduction is zero for states up to 50% of budget and is linear from 0 to 100% reduction for the range from 50% to 100% of budget, and 100% reduction for usage above 100% of budget. Table 8 lists the preferred reductions determined for the illustrated embodiment. A 100% reduction means that it is preferred that no traffic of that protocol/type be received. According to this formula all message types are associated with some non-zero preferred reduction.

TABLE 8

Example preferred reductions a node.

| Protocol | Message group | N1 | N2 | N3 |
|---|---|---|---|---|
| HTTP | Get | 100% | 100% | 100% |
| " | Put | 100% | 100% | 100% |
| SMTP | Send | 100% | 100% | 100% |
| " | Receive | 100% | 100% | 100% |
| SIP | Mid-Call | 34% | 100% | 100% |
| " | Invite | 50% | 100% | 100% |
| " | Non-call | 34% | 100% | 100% |
| SNMP | Get | 100% | 100% | 100% |

The reduction amount determined in step 350 can be determined for any level of granularity. For example, in embodiments in which overload states are associated with the entire protocol, the reduction amount is for all messages associated with that protocol.

In some embodiments, the reduction is determined at a different level of granularity than the overload event. For example, if the overload event is determined for the protocol as a whole, the reduction can be targeted on the hot spots, e.g., the peaks in the two-dimensional histogram, such as depicted in FIG. 4B.

The reduction may be expressed in any manner. In some embodiments, the reduction is expressed as a maximum number of transactions per second rather than a percentage of prior traffic. For example, if it is determined in step 350 to reduce SIP INVITE messages by 50% as indicated in Table 8, and it is assumed that traffic rates have been 15 SIP INVITE messages per second, then the reduction is expressed as a maximum of 8 SIP INVITE messages per second. In some embodiments, the maximum traffic rate is determined from the preferred reduction percentage and the new budgeted amount, e.g., 50% of the new budget amount 20 for a maximum of 10 SIP INVITE messages per second.

If the budget is borrowed from another protocol/message type, as described above, then the reduction request is for other traffic instead of the traffic originally near overload, at least for some embodiments. For example, for a threshold of 75%, the reduction is not directed to the SIP Non-Call traffic, which was originally over budget at 200%, but instead to HTTP Get traffic, at least in part, which was at 50% originally, not near an overload state. Thus, in this example, a heavily loaded SIP application causes a request to reduce a completely different application. This option is not known to be available in prior art approaches In step 360, an overload event message with the preferred reduction is sent to subscribers or neighboring nodes or both. For example, in some embodiments, a SIP NOTIFY message is sent to one or more nodes that subscribed to such notification in step 302. In some embodiments, the message is sent only to a node that is requested to reduce its traffic. For example, a message for 50% reduction at neighboring node N1 is sent only to neighboring node N2. In some embodiments, the message is only sent for message types that have actually been received. For example, overload messages are not sent to N3 for non-SNMP traffic even though these are at 100%; because no such messages were received during the averaging time. This step saves on extraneous NOTIFY message traffic from the node to its neighbors.

FIG. 5 is a block diagram that illustrates data fields in an overload event message 500, according to an embodiment. The overload even message 500 includes a SIP NOTIFY message 510 sent in response to a subscription request received during step 302. The SIP NOTIFY message header includes a field that holds data that indicates the node sending the SIP NOTIFY message, e.g., the node on which the load manager is executing to perform the steps of method 300. The payload of the SIP NOTIFY message includes an eXtensible Markup Language (XML) document 520. XML documents are text strings that are structured and self-labeling that are widely known and used to exchange information between processes. SIP NOTIFY messages have been used to carry XML documents in other approaches. According to the illustrated embodiment, the XML document includes data fields 522, 524, 526.

Field 522 holds data that indicates a near overload protocol/message type to be reduced. Any level of granularity may be used. For example, in some embodiments, field 522 holds data that indicates the SIP messages. In some embodiments, field 522 holds data that indicates SIP INVITE messages. In some embodiments in which only a particular source is to reduce traffic, regardless of protocol/message type, field 522 is omitted.

Field 524 holds data that indicates a source node from which messages of the type indicated in field 522 are to be reduced. For example, in some embodiments, field 524 holds data that indicates the neighboring node NI. In some embodiments, in which a particular source is not identified for reducing traffic, field 524 is omitted. Fields 522 and 524 are not both omitted in the same embodiment.

Field 526 holds data that indicates an amount of reduction for the protocol/message type and source node identified in fields 522 and 524. Unlike prior art approaches that indicate a time during which all traffic is diverted from the node sending the message, in the illustrated embodiments less than all traffic is indicated. For example, in various embodiments a reduction of 10% or 25% or 50% or 90% is indicated by the data in field 526. The reduction may be expressed in any manner. In some embodiments, the reduction is expressed as a maximum number of transactions per second rather than a percentage.

As is well known for XML data one or more data fields of any or several of data fields 522, 524, 526 may be nested in data fields 522, 524, 526 or other fields in the XML document 520.

It is assumed for purposes of illustration that, during step 360, an SIP NOTIFY message is sent to neighboring node N1 and other subscribers of overload events. The SIP NOTIFY message includes a field 522 that indicates SIP INVITE method type, a field 524 that indicates source node N1, and a field 526 that indicates a maximum number of 10 transactions per minute.

In other embodiments, other types of protocols and message types are used to convey the overload event message. For example, in some embodiments a Simple Object Access Protocol (SOAP) message encapsulated in HTTP data packets is used to send the overload event message.

In some embodiments, the reduction request expires automatically after a default time, such as one hour. In some embodiments, step 360 includes inserting in the overload event message another field with a non-default time for the reduction request to expire, such as after five minutes. In some embodiments, step 360 includes sending a separate overload event message, such as a SIP NOTIFY message, when usage at the sending node has fallen sufficiently to end the reduction request, as determined during step 322, described above.

Figure 3B:
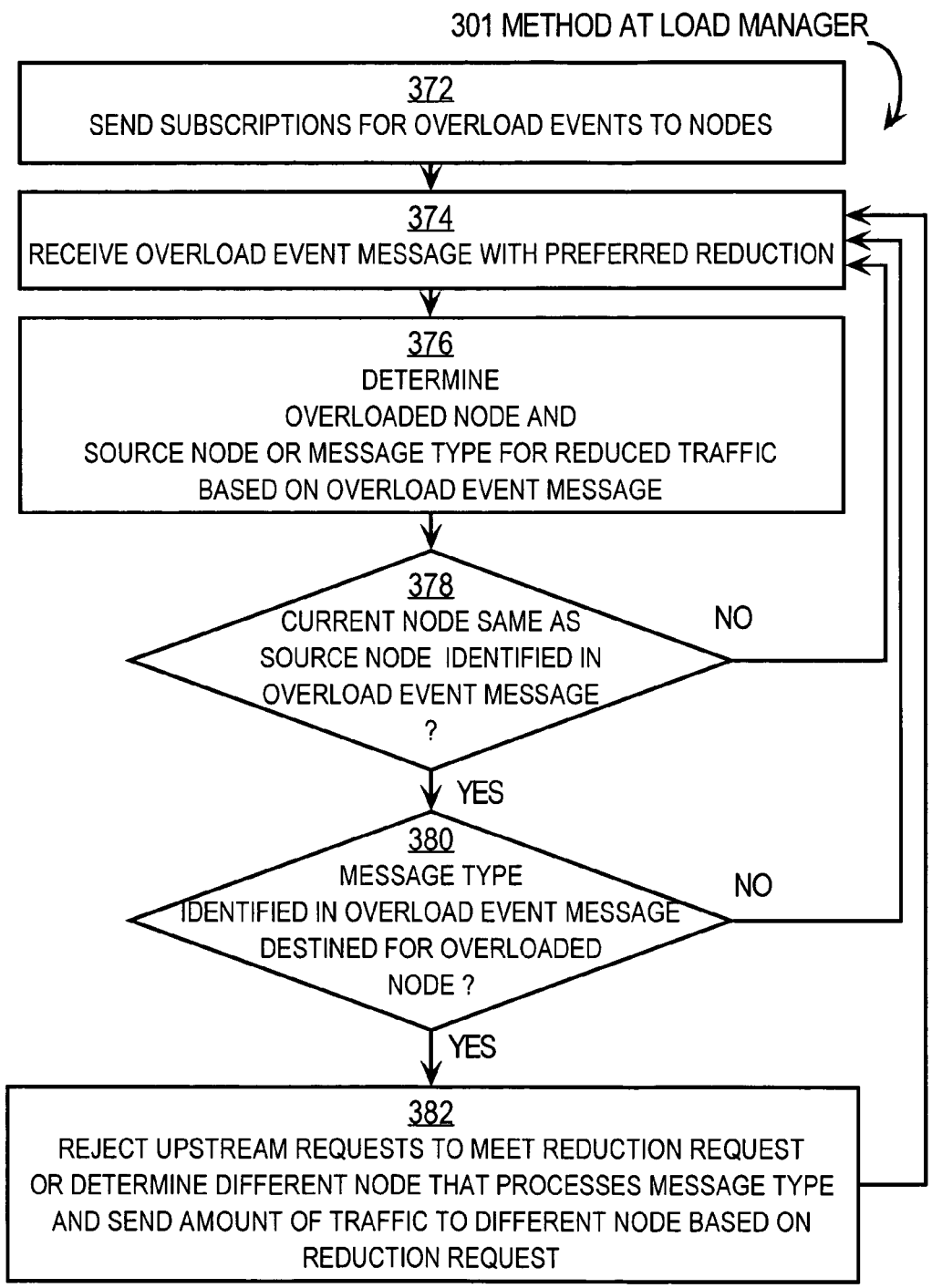
FIG. 3B is a flow diagram that illustrates at a high level a method for responding to overload events on a load manager on a call server host, according to another embodiment.

FIG. 3B is a flow diagram that illustrates at a high level a method 301 for responding to overload events on a load manager on a call server host, according to another embodiment.

In step 372 a subscription for overload events is sent to one or more nodes. For example, a load manager 190*d* on service engine node 130*a* sends a SIP SUBSCRIBE message to load manger 190*f* on application node 140*a* which is assumed, for purposes of illustration, to host a call forwarding (CF) application. The SIP SUBSCRIBE message indicates the sending node is to be notified of overload events related to SIP messages. Any level of granularity may be requested in the SIP SUBSCRIBE message. For example, in some embodiments the SIP SUBSCRIBE message indicates the sending node is to be notified of overload events related to SIP INVITE messages only, or SIP INVITE messages from node 130*a* only.

In step 374, the load manager receives an overload event message with preferred reduction. For example, the load manager 190*d* on service engine node 130*a* receives a SIP NOTIFY message, as depicted in FIG. 5, from load manger 190*f* on application node 140*a*. It is further assumed, for purposes of illustration, that the SIP NOTIFY message includes fields 522, 524, 536 in an XML document, which indicate that SIP INVITE traffic should be reduced to a maximum rate of 10 per second.

In step 376, the load manger determines the overloaded node and the source node or message type for reduced traffic based on the overload event message. For example, the load manager 190*d* on service engine node 130*a* determines that SIP INVITE traffic to application node 140*a* should be reduced to a maximum rate of 10 per second based on the SIP NOTIFY message received in step 374.

In step 378, it is determined whether the source node identified in the overload event message is the same as the current node on which the load manager is executing. If so, or if no source node is specified in the overload event message, then control passes to step 380. If not, then the overload message is not directed to the current node and the overload message is ignored. Control passes back to step 374 to receive the next overload event message. For example, if service engine node 130*a* is the neighbor node N1 specified as the source node in the overload event message, or if the source node is not specified, control passes to step 380.

In step 380, it is determined whether a message type identified in the overload event message is currently destined for the overloaded node. If not, control passes to step 374 to receive the next overload event message. If it is determined that a message type identified in the overload event message is currently destined for the overloaded node, then control passes to step 382. For example, load manger 190*d* determines whether a SIP INVITE message is currently destined for application node 140*a*, and if so passes control to step 382.

In step 382, a different node that processes the message type is determined and an amount of traffic is sent to the different node based on the reduction request; or requests from upstream nodes that exceed the reduced traffic requested are rejected.

For example, in an illustrated embodiment, the load manager 190*d* determines that application node 140*c* also hosts a SIP call forwarding application. Any method may be used to determine the other application node that hosts an application for processing the desired message type. For example, a discovery request can be broadcast asking for nodes that provide SIP or CF processing. It is assumed for purposes of illustration that 25 SIP INVITE messages are to be sent per second from service engine node 130*a*. Based on the reduction request, only 10 SIP INVITE messages per second are still sent to application node 140*a*, and 15 per second are diverted to application node 140*c*. Control then passes to back to step 374 to receive the next overload event message.

If there is no other node that provides the same call application service, then step 382 involves refusing the excess traffic, or reducing the budget for that traffic on the current node, or sending a overload event message to a set of one or more neighbors of the current node that are causing the excess traffic. For example, if the SIP INVITE traffic is for servicing calls from edge proxy nodes 120*a*, 120*b*, 120*c*, then an overload event message is constructed and sent to enough of those edge proxy nodes to reduce the traffic by 15 calls per second. Because this determination is made by node 130*a* which is not near an overload state, this processing is not a burden on the node 130*a*. If the request is sent to edge node 120*b*, to reduce SIP INVITES by 15, then edge node 120*b* easily directs a SIP RETRY AFTER message to 15 SIP phones 102 in its fan out, because the edge node 120*b* is not near overload state when it receives the reduction message from service engine node 130*a*.

In the illustrated embodiments, both method 300 and method 301 are included in load manger 290, and one or the other or both are included in the load managers 190 depicted in FIG. 1.

By pushing the reduction request to the neighboring node, e.g., service engine node 130*a*, the neighboring node which is not near an overloaded state takes the burden of filtering the messages sent to the near overloaded server host according to method 300 and 301. The overloaded or near overloaded node does not take on the extra processing. This is especially advantageous when the neighboring non-overloaded node is an aggregation point for a fan out. Then the non-overloaded aggregation point, e.g., proxy edge node 120b, can handle the multiple SIP messages with reduction or RETRY AFTER information to the many nodes in the fan out, e.g., to SIP phones 102.

4.0 Implementation Mechanisms—Hardware Overview

Figure 6:
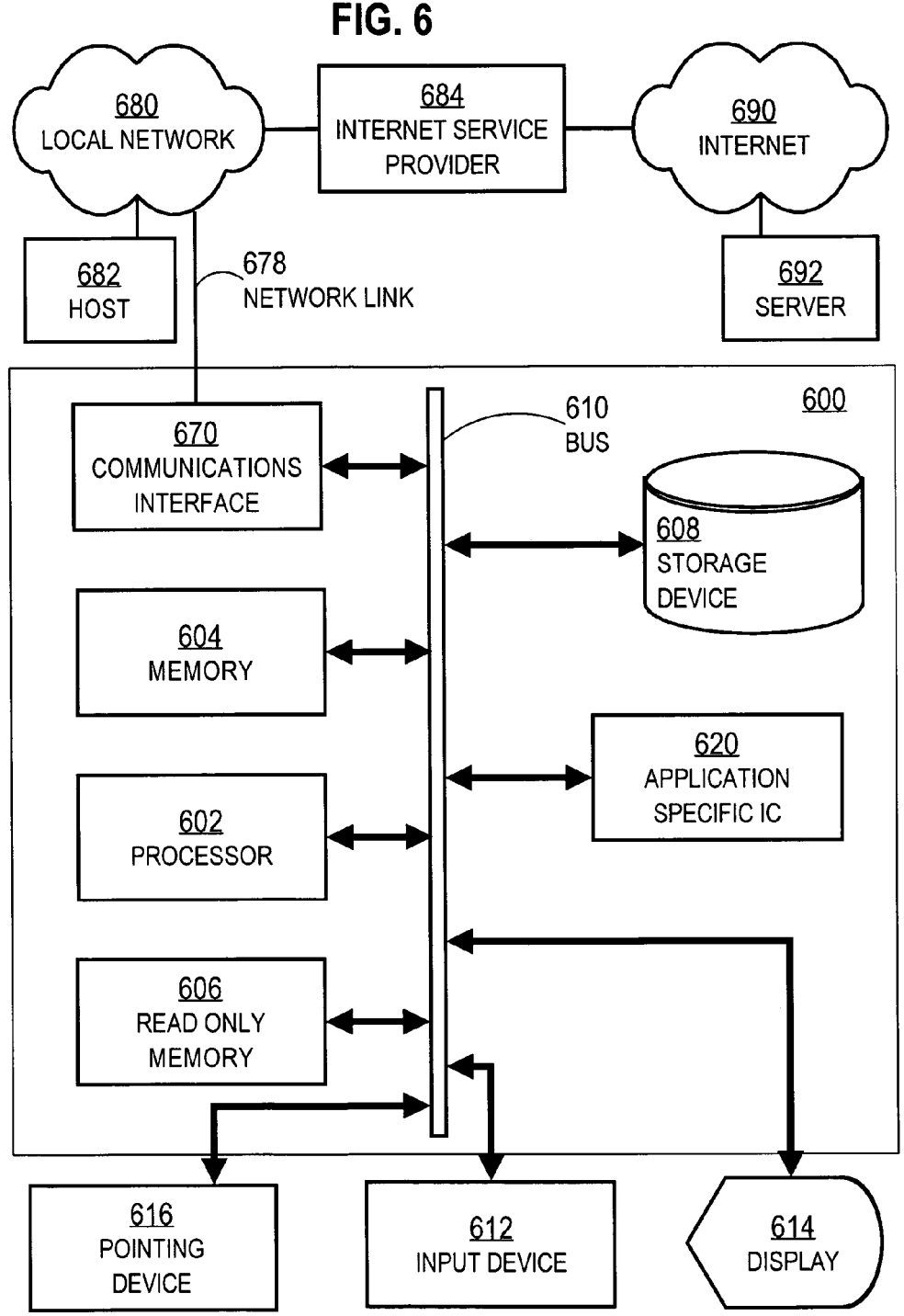
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 602, including instructions for execution. Such a medium may take many forms, including, but not limited to, non-volatile media, and volatile media. Non-volatile media include, for example, optical or magnetic disks, such as storage device 608. Volatile media include, for example, dynamic memory 604. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, which carry information to and from computer system 600, are exemplary forms of carrier waves. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing load on a server for real-time communications on a packet-switched network, comprising:

receiving, on a particular intermediate node of a real-time communications packet-switched network, usage data that indicates an amount of computational resources on the particular intermediate node consumed by a set of one or more application layer processes for a first type of a plurality of types of data packets processed at the particular intermediate node, wherein the first type of the plurality of types of data packets is an application layer protocol message type;

determining whether the amount of computational resources consumed indicated by the usage data exceeds a central processing unit threshold amount associated with proximity to performance degradation at the particular intermediate node, the central processing unit threshold amount being below a central processing unit budget for the particular intermediate node and the computational resources being central processing unit resources;

determining a particular source of data packets of a second type of the plurality of types of data packets processed at the particular intermediate node among a plurality of sources of the data packets of the second type;

if it is determined that the amount of computational resources consumed exceeds the central processing unit threshold amount, then sending to a first different node on the real-time communications packet-switched network a message that includes overload state data that indicates the second type of the plurality of types of data packets, and a reduction request to reduce an amount of data packets of the second type that are sent to the particular intermediate node;

determining the second type that is both different from the first type and lower priority than the first type at the particular intermediate node; and increasing the central processing unit threshold amount associated with performance degradation at the particular intermediate node for the first type.

2. A method as recited in claim 1, wherein the first different node is a neighbor of the particular intermediate node on the real-time communications packet-switched network.

3. A method as recited in claim 1, wherein the first type of the plurality of types of data packets is an application layer protocol message type includeing a plurality of session signaling method types of the Session Initiation Protocol (SIP).

4. A method as recited in claim 1, wherein the first type of the plurality of types of data packets is an application layer protocol message type associated with at least one of a plurality of application layer protocols selected from the group consisting of hypertext transfer protocol, simple mail transfer protocol, and simple network management protocol.

5. A method as recited in claim 1, wherein the plurality of types of data packets processed at the particular intermediate node includes a plurality of applications using the same application layer protocol.

6. A method as recited in claim 1, wherein the threshold amount leaves sufficient computational resources at the particular intermediate network node to determine and send the message that includes the overload state data.

7. A method as recited in claim 1, wherein sending the message that includes overload state data further comprises determining the second type in order to enhance servicing of requests for a call service in the real-time communications packet-switched network.

8. A method as recited in claim 1, wherein sending the message that includes overload state data further comprises determining the second type based at least in part on overload state data received from a second different node.

9. A method as recited in claim 1, further comprising:
including data that indicates the particular source in the reduction request requesting that data packets of the second type from the particular source are not sent to the particular intermediate node.

10. A method as recited in claim 1, further comprising:
determining a decrease amount of data packets of the second type; and
including data that indicates the decrease amount in the reduction request, wherein it is requested that data packets of the second type from the first different node are decreased based on the decrease amount.

11. A method as recited in claim 1, wherein:
the method further comprises a step of receiving a subscription message from the first different node for notification of an overload event;
said step of determining whether the amount of computational resources exceeds the threshold amount comprises determining whether the overload event has occurred; and
said step of sending the message that includes overload state data comprises sending an event notification message to the first different node.

12. A method as recited in claim 11, wherein:
said step of receiving a subscription message from the first different node for notification of an overload event comprises receiving a Session Initiation Protocol (SIP) subscription message;
said step of sending the event notification message to the first different node comprises sending a SIP notification message to the first different node.

13. A method as recited in claim 1, wherein sending the message that includes overload state data further comprising comprises sending an eXtensible Markup Language (XML) document that indicates the overload state data.

14. A method as recited in claim 13, wherein sending the eXtensible Markup Language (XML) document that indicates the overload state data further comprises sending the XML document in a Session Initiation Protocol (SIP) message.

15. A method as recited in claim 1, further comprising:
receiving from a second different node on the real-time communications packet-switched network a message that includes overload state data for the second different node that indicates a third type of a plurality of types of data packets processed at the second different node by another set of one or more application layer processes, and
a second reduction request to reduce an amount of data packets of the third type that are sent to the second different node; and
in response to receiving the message that includes the overload state data for the second different node, causing a reduction in an amount of data packets of the third type that are sent to the second different node based at least in part on the second reduction request.

16. A method as recited in claim 1, wherein sending to the first different node the message that includes overload state data further comprises not sending the message that includes overload state data to at least one neighboring node connected by a communication link with the particular intermediate node.

17. The method of claim 1, wherein the first type of the plurality of types of data packets is a Session Initiation Protocol (SIP) invite message.

18. The method of claim 1, wherein the first type of the plurality of types of data packets is a Session Initiation Protocol (SIP) call setup message.

19. The method of claim 1, wherein the first type of the plurality of types of data packets is a call setup message for voice telephony.

20. The method of claim 1, wherein the first type of the plurality of types of data packets is associated with Real-time Transport Protocol (RTP) or H.323.

21. A method for managing load on a server for real-time communications on a packet-switched network, comprising:
receiving, on a particular intermediate node of a real-time communications packet-switched network, usage data that indicates an amount of computational resources on the particular intermediate node consumed by a set of one or more application layer processes for a first type of data packets processed at the particular intermediate node, wherein the first type of data packets is an application layer protocol message type;
determining whether the amount of computational resources consumed indicated by the usage data exceeds a processing threshold amount associated with proximity to performance degradation at the particular intermediate node, the processing threshold amount being below a processing budget for the particular intermediate node and the computational resources being processing resources;
determining a particular source of data packets of a second type; and
if it is determined that the amount of computational resources consumed exceeds the processing threshold amount, then sending to a first different node on the real-time communications packet-switched network a message that includes overload state data that indicates:
the particular source of the data packets processed at the particular intermediate node;
a reduction request to reduce an amount of the data packets that are sent to the particular intermediate node from the particular source for processing at the particular intermediate node;
determining the second type that is both different from the first type and lower priority than the first type at the particular intermediate node; and
increasing the processing threshold amount associated with performance degradation at the particular intermediate node for the first type.

22. A method as recited in claim 21, wherein the particular source is the same as the first different node.

23. A method as recited in claim 21, said step of sending to the first different node the message that includes overload state data further comprising not sending the message that includes overload state data to at least one neighboring node connected by a communication link with the particular intermediate node.

24. An apparatus for real-time communications on a packet-switched network, comprising:
a network interface that is coupled to a real-time communications packet-switched network for communicating therewith a data packet;
one or more processors;
a computer-readable medium; and
one or more sequences of instructions stored in the computer-readable medium, which, when executed by the one or more processors, causes the one or more processors to perform:
receiving usage data that indicates an amount of computational resources on the apparatus consumed by a set of one or more application layer processes for a first type of a plurality of types of data packets processed at the apparatus for real-time communications on a packet switched network, wherein the first type of the plurality of types of data packets is an application layer protocol message type;

determining a particular source of data packets of a second type of the plurality of types of data packets processed at the apparatus from among a plurality of sources of the data packets of the second type;

determining whether the amount of computational resources consumed indicated by the usage data exceeds a central processing unit threshold amount associated with proximity to performance degradation at the apparatus; and if it is determined that the amount of computational resources consumed exceeds the threshold amount, then sending to a first different node on the real-time communications packet-switched network a message that includes overload state data that indicates the second type, and a reduction request to reduce an amount of data packets of the second type that are sent to the apparatus, wherein the processing threshold amount is an amount below a central processing unit budget for a particular intermediate node and the computational resources being central processing unit resources; and determining the second type that is both different from the first type and lower priority than the first type at the particular intermediate node; and increasing the central processing unit threshold amount associated with performance degradation at the particular intermediate node for the first type.

25. A non-transitory computer-readable medium carrying one or more sequences of instructions for managing load on a server for real-time communications on a packet-switched network, wherein execution of the one or more sequences of instructions by one or more processors causes the one or more processors to perform:

receiving, on a particular intermediate node of a real-time communications packet-switched network, usage data that indicates an amount of computational resources on the particular intermediate node consumed by a set of one or more application layer processes for a first type of a plurality of types of data packets processed at the particular intermediate node, wherein the first type of the plurality of types of data packets is an application layer protocol message type;

determining whether the amount of computational resources consumed indicated by the usage data exceeds a central processing unit threshold amount associated with proximity to performance degradation at the particular intermediate node, the processing threshold amount being an amount below a central processing unit budget for the particular intermediate node and the computational resources being central processing unit resources;

determining a particular source of data packets of a second type of the plurality of types of data packets processed at the particular intermediate node from among a plurality of sources of the data packets of the second type;

if it is determined that the amount of computational resources consumed exceeds the threshold amount, then sending to a first different node on the real-time communications packet-switched network a message that includes overload state data that indicates the second type, and a reduction request to reduce an amount of data packets of the second type that are sent to the particular intermediate node;

determining the second type that is both different from the first type and lower priority than the first type at the particular intermediate node; and increasing the central processing unit threshold amount associated with performance degradation at the particular intermediate node for the first type.

\* \* \* \* \*

UNITED STATES PATENT AND TRADEMARK OFFICE
CERTIFICATE OF CORRECTION

| | | |
|---|---|---|
| PATENT NO. | : 8,045,473 B2 | Page 1 of 1 |
| APPLICATION NO. | : 11/287911 | |
| DATED | : October 25, 2011 | |
| INVENTOR(S) | : Michael Philip Hammer | |

It is certified that error appears in the above-identified patent and that said Letters Patent is hereby corrected as shown below:

<u>In the Claims</u>

In column 24, claim 3, line 43, after "protocol message type" replace "includeing" with --including--.

In column 25, claim 13, line 34, after "state data further" delete "comprising".

Signed and Sealed this
Tenth Day of April, 2012

David J. Kappos
*Director of the United States Patent and Trademark Office*